United States Patent
Yoon

(10) Patent No.: US 8,198,766 B2
(45) Date of Patent: Jun. 12, 2012

(54) SPINDLE MOTOR

(75) Inventor: Ho Eop Yoon, Gyeonggi-do (KR)

(73) Assignee: LG Innotek Co., Ltd., Seoul (KR)

( * ) Notice: Subject to any disclaimer, the term of this patent is extended or adjusted under 35 U.S.C. 154(b) by 321 days.

(21) Appl. No.: 12/698,760

(22) Filed: Feb. 2, 2010

(65) Prior Publication Data

US 2010/0194249 A1 Aug. 5, 2010

(30) Foreign Application Priority Data

Feb. 3, 2009 (KR) .................. 10-2009-0008399

(51) Int. Cl.
*H02K 7/00* (2006.01)

(52) U.S. Cl. .................................. 310/67 R; 310/91
(58) Field of Classification Search ................ 310/67 R, 310/89–91
See application file for complete search history.

(56) References Cited

U.S. PATENT DOCUMENTS

| | | | | |
|---|---|---|---|---|
| 5,061,868 A * | 10/1991 | Iwazaki et al. | | 310/67 R |
| 6,525,441 B2 * | 2/2003 | Yamaguchi | | 310/90 |
| 6,806,601 B2 * | 10/2004 | Miyamoto | | 310/68 B |
| 7,816,831 B2 * | 10/2010 | Kim | | 310/156.26 |
| 7,915,774 B2 * | 3/2011 | Lee | | 310/90 |
| 8,076,806 B2 * | 12/2011 | Lee | | 310/67 R |
| 8,089,186 B2 * | 1/2012 | Lee | | 310/90 |
| 2002/0074879 A1 * | 6/2002 | Jun | | 310/90 |
| 2007/0290571 A1 * | 12/2007 | Yoon | | 310/261 |

* cited by examiner

*Primary Examiner* — Thanh Lam
(74) *Attorney, Agent, or Firm* — Saliwanchik, Lloyd & Eisenschenk

(57) ABSTRACT

A spindle motor is disclosed, wherein a coupling protruder of a stopper is penetrated into a rotor yoke by caulking. Therefore, no foreign objects that are generated from welding process are produced to inhibit the spindle motor from generating defects caused by the foreign objects and to improve the product reliability. Furthermore, the coupled protruder of the stopper is coupled to the rotor yoke by caulking, to make an assembly process simple. Still furthermore, the spindle motor according to the present invention is economical in that, in a case the coupled stopper is to be separated from the rotor yoke, the coupled stopper and the rotor yoke can be simply separated by cutting off a caulked portion of the coupled protruder, thereby allowing the rotor yoke to be re-used.

11 Claims, 3 Drawing Sheets

SPINDLE MOTOR

CROSS-REFERENCE TO RELATED APPLICATION

This application claims the benefit under 35 U.S.C. §119 of Korean Application No. 10-2009-0008399, filed Feb. 3, 2009, which is hereby incorporated by reference in its entirety.

BACKGROUND

A spindle motor performs the function of rotating a disk to enable an optical pickup which linearly reciprocates in an optical disk drive (ODD) to read data recorded on the disk.

FIG. 1 is a cross-sectional view illustrating essential parts of the conventional spindle motor.

Referring to FIG. 1, a bearing 15 is fixed at an interior of a bearing housing 13 formed at a base 11, and the bearing 15 is rotatably supported by a rotation shaft 17. A rotor 21 having a rotor yoke 21a and a magnet 21b is coupled to a periphery of the rotation shaft 17 exposed toward an upper surface of the bearing housing 13. The rotor 21 cooperatively rotate with a stator (not shown) fixed at the periphery of the bearing housing 13.

An outwardly extended hitching edge 13a is formed at an upper periphery of the bearing housing 13, and the rotor yoke 21a is coupled with a stopper 25 that prevents the rotation shaft 17 and the rotor 21 from being disengaged by being hitched at the hitching edge 13a.

The conventional spindle motor thus configured is coupled to the rotor yoke 21a by way of welding, such that foreign objects generated from the welding are sticked to and stiffened at the stopper 25 or the rotor yoke 21a. The conventional spindly motor suffers from a disadvantage in that the foreign objects contact other parts to cause defects such as noise generation and the like, thereby degrading the reliability of the product.

The conventional spindle motor suffers from another disadvantage in that workability is cumbersome and inconvenient due to use of a welding machine for coupling the stopper 25 to the rotor yoke 21a. Furthermore, the conventional spindle motor suffers from still another disadvantage in that the welded coupling between the stopper 25 and the rotor yoke 21a makes it difficult for the stopper 25 to be separated from the rotor yoke 21a without damages to the stopper and the rotor yoke, whereby it is difficult to repair and re-use the stopper and the rotor yoke, and it is also uneconomical to dispose of the stopper and the rotor yoke due to high disposal cost.

BRIEF SUMMARY

An object of the present invention is to obviate the above-mentioned problems, and it is an object to provide a spindle motor that has improved a coupled structure between a stopper and a rotor yoke.

Additional advantages, objects, and features of the disclosure will be set forth in part in the description which follows and in part will become apparent to those having ordinary skill in the art upon examination of the following or may be learned from practice of the disclosure. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a spindle motor according to some exemplary embodiment of the present disclosure may comprise: a base; a stator provided at the base; a rotation shaft centrally positioned at the stator and vertically provided at the base; and a rotor fixed at the rotation shaft to rotate in response to the stator and to integrally rotate with the rotation shaft; and a stopper, one side of which is coupled to the rotor by caulking while the other side of which is hitched by the stator to prevent the rotor yoke and the rotation shaft from being disengaged from the stator.

BRIEF DESCRIPTION OF DRAWINGS

FIG. 3b is a cross-sectional view along line A-A of FIG. 3a.

DETAILED DESCRIPTION

A spindle motor according to the exemplary embodiments of the present invention will be described in detail with reference to the accompanying drawings.

Figure 1:
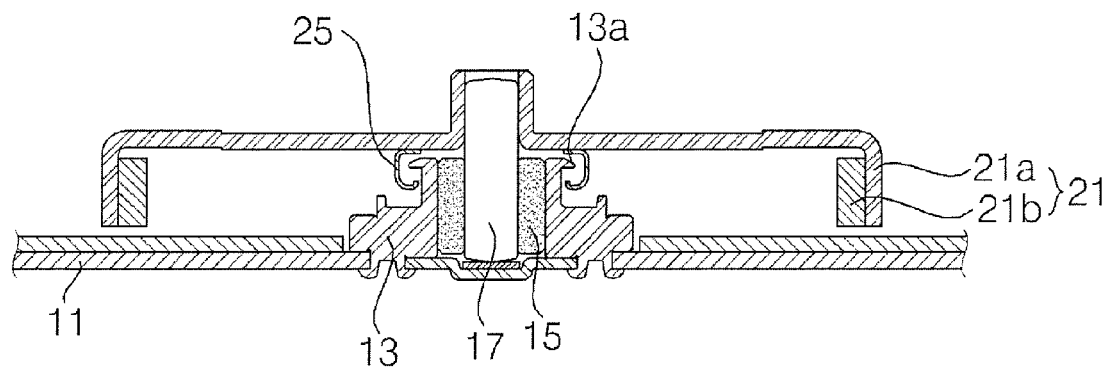
FIG. 1 is a cross-sectional view illustrating essential parts of the conventional spindle motor.
Figure 2:
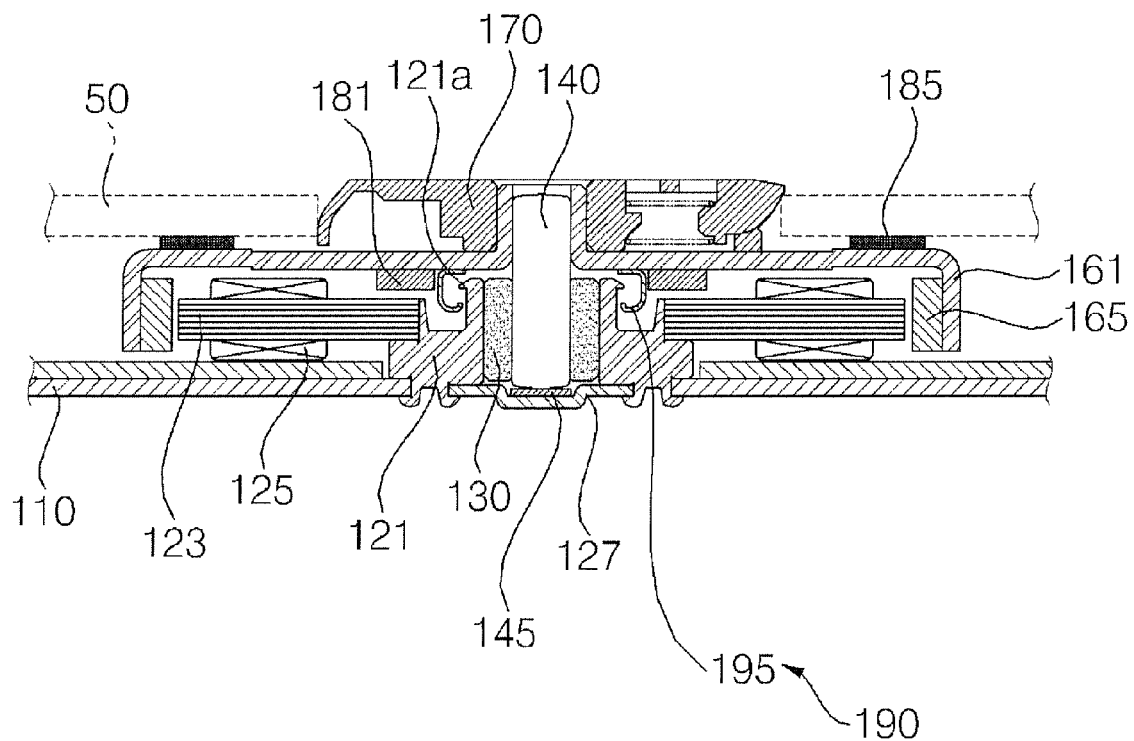
FIG. 2 is a cross-sectional view illustrating a spindle motor according to an exemplary embodiment of the present invention.

FIG. 2 is a cross-sectional view illustrating a spindle motor according to an exemplary embodiment of the present invention.

A base is provided as shown in FIG. 2. In designating a direction and a surface of constituent parts, a direction and a surface facing an upper vertical side of the base 110 are respectively called "an upper side" and "an upper surface", while a direction and a surface facing a bottom vertical side of the base are respectively called "a bottom side" and "a bottom surface". A stator is provided at an upper surface of the base 110.

The stator includes a cylindrical bearing housing 121 with upper and bottom surfaces being opened and the bottom surface being coupled to the base 110, a core 123 fixed at a periphery of the bearing housing 121, and a coil 125 wound on the core 123.

A thrust stopper 127 is coupled to a bottom inner surface of the bearing housing 121 to air-tightly seal the bottom surface of the bearing housing 121. The bearing housing 121 is coupled at a bottom surface side to the base 110 to be erectively and vertically installed on the base 110, and an upper outer circumferential surface of the bearing housing 121 is formed with a ring-shaped hitching edge 121a that is protruded outwardly.

A bearing 130 is press-fit into the bearing housing 121 and the bearing 130 is supportively and rotatably installed with an outer bottom surface of a rotation shaft 140. An upper side of the bearing housing 121 is exposed upwardly. The rotation shaft 140 is coupled with a rotor.

The rotor includes a cylindrical rotor yoke 161 whose lower surface is opened, and whose upper central side is coupled to an upper periphery of the rotation shaft 140 and whose lateral surface wraps the stator, and a ring-shaped magnet 165 coupled to a lateral inner periphery of the rotor yoke 161 to face the stator.

In a case a current flows in the coil 125, the magnet 165 is rotated by the electromagnetic force generated between the coil 125 and the magnet 126, whereby the rotor yoke 161 and the rotation shaft 140 are rotated.

The rotor yoke 161 is mounted thereon with a disk 50, and a portion of the rotor yoke 161 to which the rotation shaft 140 is coupled is formed with a clamping device 170 for inhibiting the disk 50 from being disengaged and supportively matching a center of the disk (50) with a center of the rotation shaft 140. A ring-shaped suction magnet 181 is coupled to an upper surface of the rotor yoke 161. The suction magnet 181 prevents the rotation shaft 140 and the rotor from floating upward when the rotor and rotation shaft are rotated.

The bearing housing 121 is supportively fixed by a bearing 130 such that the bearing housing 121 serves as a support member supporting the bearing 130. In a spindle motor in which there is no bearing housing 121 and the bearing 130 is supportively fixed by an inner circumferential surface of the core 123, the core 123 serves as a support member supporting the bearing 130.

Unexplained reference numeral 145 in FIG. 2 is a thrust plate supporting a lower surface of the rotation shaft 140 to reduce noise and friction, and 185 is a felt inhibiting the disk 50 mounted on the rotor yoke 161 from slipping during rotation.

The rotation shaft 140 and the rotor may be disengaged upwardly from the bearing housing 121 when the rotation shaft 140 and the rotor are rotated or when there is an external shock. In order to prevent the rotation shaft 140 and the rotor from being disengaged upwardly from the bearing housing 121, the rotor yoke 161 is disposed thereon with a stopper 190.

In the spindle motor according to the present invention, in a case the mutually coupled rotor yoke 161 and the stopper 190 are to be separated for repair, the stopper 190 is physically coupled to the rotor yoke 161 to damage the stopper 190 and to re-use the rotor yoke 161, the explanation of which will be given with reference to FIGS. 3a and 3b.

Figure 3A:
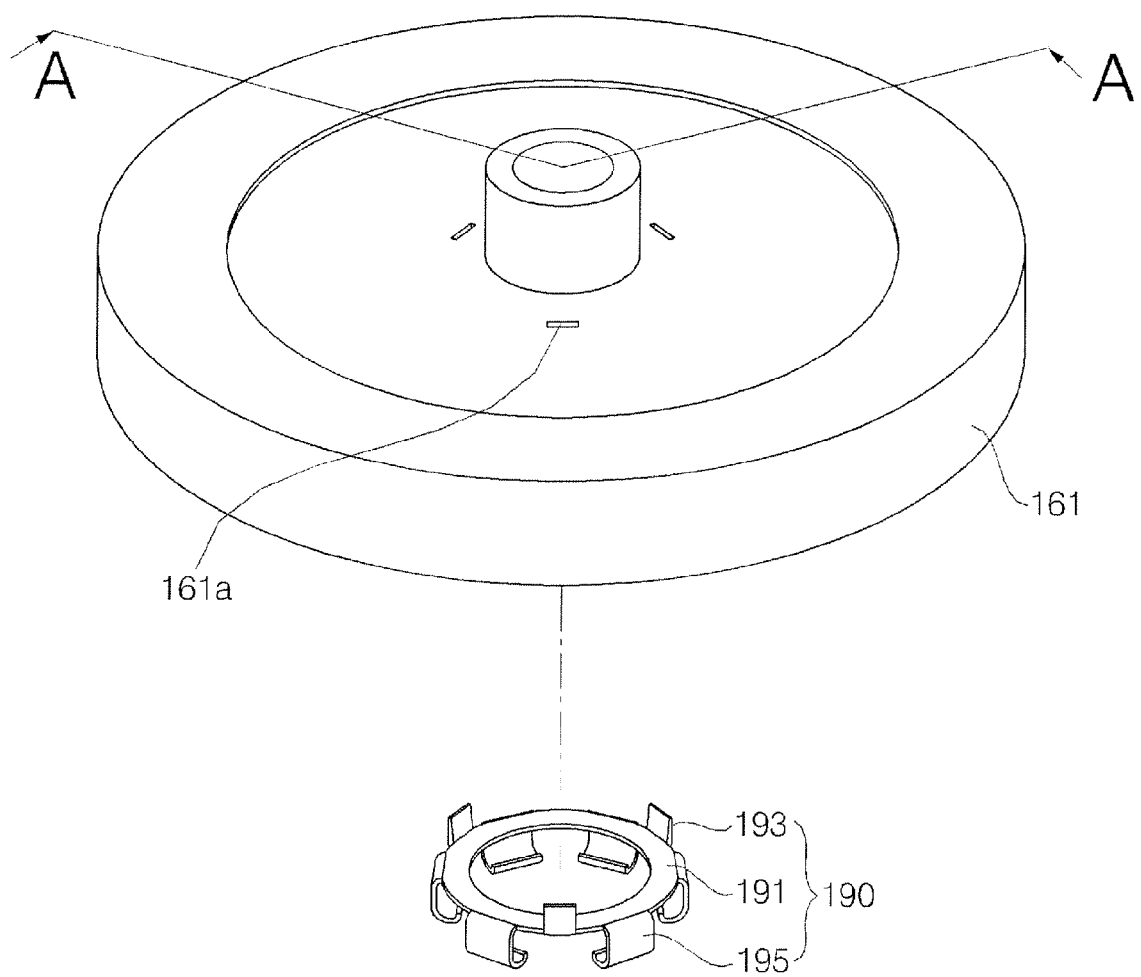
FIG. 3a is a perspective view of a rotor yoke and a stopper illustrated in FIG. 2.
Figure 3B:
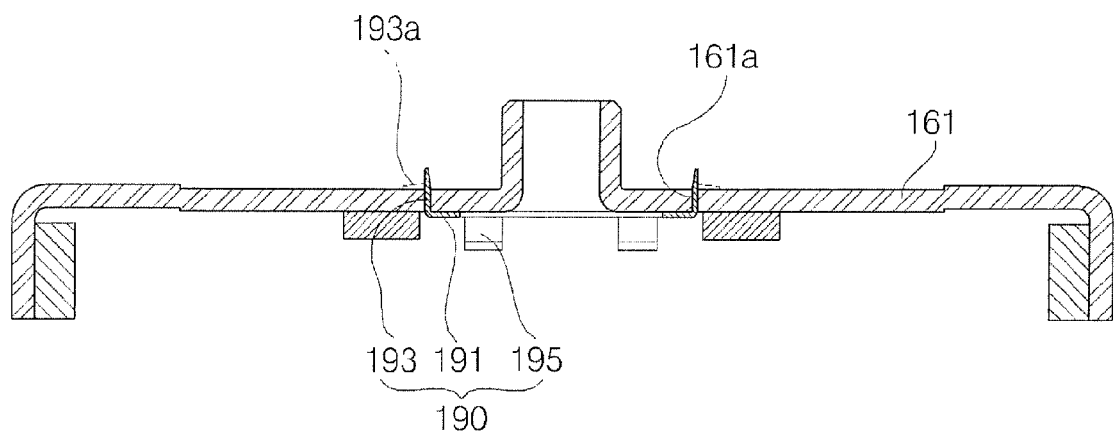

FIG. 3a is a perspective view of a rotor yoke and a stopper illustrated in FIG. 2, and FIG. 3b is a cross-sectional view along line A-A of FIG. 3a.

Referring to FIGS. 3a and 3b, the stopper 190 includes a ring-shaped body 191, a plurality of coupling protruders 193 extensively and upwardly formed from a periphery of the body 191 for being inserted into the rotor yoke 161 by caulking, and a plurality of hitching protruders 195 extensively and downwardly formed from a periphery of the body 191 for being hitched at a hitching edge 121a of the bearing housing 121.

Each of the coupling protruders 193 and the hitching protruders 195 is radially formed about the center of the body 191, where the coupling protruders 193 and the hitching protruders 195 are alternatively formed.

The rotor yoke 161 is formed with a through hole 161a facing the coupled protruders 193, and the coupled protruders 193 is caulked to a distal end side after being inserted into the through hole 161a, whereby the stopper 190 is coupled to the rotor yoke 161.

The bearing 130 is impregnated with oil, and the oil discharged from the bearing 130 rises along lateral surfaces of the bearing 130 and the rotation shaft 140 to soak the rotor yoke 161. Meanwhile, if there is a gap between the coupled protruders 193 and the through hole 161a, the oil is introduced into the gap between the coupled protruders 193 and the through hole 161a and leaked into the clamping device 170 side.

In order to prevent the oil from being introduced into the gap between the coupled protruders 193 and the through hole 161a and leaked into the clamping device 170 side, an adhesive is coated on an inner circumferential surface of the through hole 161a and an outer surface of the coupled protruders 193. The adhesive may be coated on a portion 193a of the coupled protruders 193 caulked in the form of covering the through hole 161a.

In order to faciliate each of the coupled protruders 193 to be inserted into the through hole 161a, each of the coupled protruders is inclinatorily tapered off toward its distal end with a gradual thinner thickness.

In a case the rotor yoke 161 is separated from the stopper 190 for repair, the stopper 190 are separated from the rotor yoke 161 by cutting off the caulked portion 193a of the coupled protruder 193. Then, although it may be impossible to re-use the stopper 190, the rotor yoke 161 which is relatively pricey may be re-useable.

Figure 4:
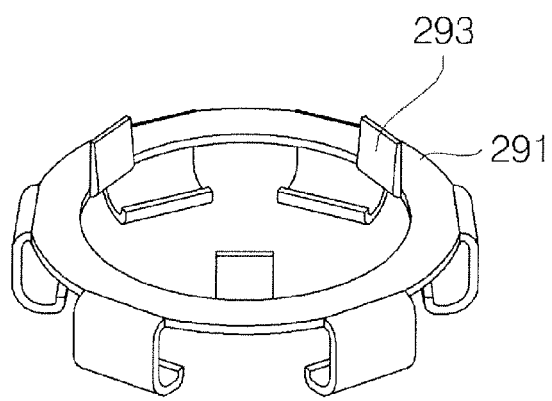
FIG. 4 is a perspective view of a stopper according to another exemplary embodiment of the present invention.

FIG. 4 is a perspective view of a stopper according to another exemplary embodiment of the present invention, where a coupled protruder 293 of a stopper 290 is extensively and upwardly formed an inner circumferential surface of a body 291.

The spindle motor according to the present invention is advantageous in that a coupling protruder of a stopper is penetrated into a rotor yoke by caulking. Therefore, no foreign objects that are generated from welding process are produced to inhibit the spindle motor from generating defects caused by the foreign objects and to improve the product reliability. Furthermore, the coupled protruder of the stopper is coupled to the rotor yoke by caulking, to make an assembly process simple. Still furthermore, the spindle motor according to the present invention is economical in that, in a case the coupled stopper is to be separated from the rotor yoke, the coupled stopper and the rotor yoke can be simply separated by cutting off a caulked portion of the coupled protruder, thereby allowing the rotor yoke to be re-used.

While the present disclosure has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

What is claimed is:

1. A spindle motor comprising:
   a base;
   a stator provided at the base;
   a rotation shaft centrally positioned at the stator and vertically provided at the base; and
   a rotor fixed at the rotation shaft to rotate in response to the stator and to integrally rotate with the rotation shaft; and
   a stopper, one side of which is coupled to the rotor by caulking while the other side of which is hitched by the stator to inhibit a rotor yoke and the rotation shaft from being disengaged from the stator.

2. The spindle motor claim 1, wherein the rotor includes a rotor yoke fixed at the rotation shaft, and the stator includes a support member erectively installed on the base at one side thereof.

3. The spindle motor claim 2, wherein the stopper includes a ring-shaped body, a plurality of coupling protruders extensively and upwardly formed from a periphery of the body for being inserted into the rotor yoke by caulking, and a plurality of hitching protruders extensively and downwardly formed from a periphery of the body for being hitched at the support member.

4. The spindle motor claim 3, wherein a periphery of the other side of the support member is formed with a ring-shaped hitching edge at which the hitching protruders are hitched.

5. The spindle motor claim 3, wherein the rotor yoke is formed with a through hole facing the coupled protruder, and the coupled protruder is inserted into the through hole by caulking.

6. The spindle motor claim 5, wherein an adhesive is coated between a periphery of the coupled protruders and an inner circumferential surface of the through hole.

7. The spindle motor claim 5, wherein a portion of the caulked coupled protruder is coated with the adhesive in the form of covering the through hole.

8. The spindle motor claim 3, wherein the coupled protruder is extensively formed from an inner circumferential surface of the body.

9. The spindle motor claim 3, wherein the coupled protruder is extensively formed from a periphery of the body.

10. The spindle motor claim 3, wherein the coupled protruder is inclinatorily tapered off toward its distal end with a gradual thinner thickness.

11. The spindle motor claim 2, wherein the support member is a bearing housing.

* * * * *